UNITED STATES PATENT OFFICE.

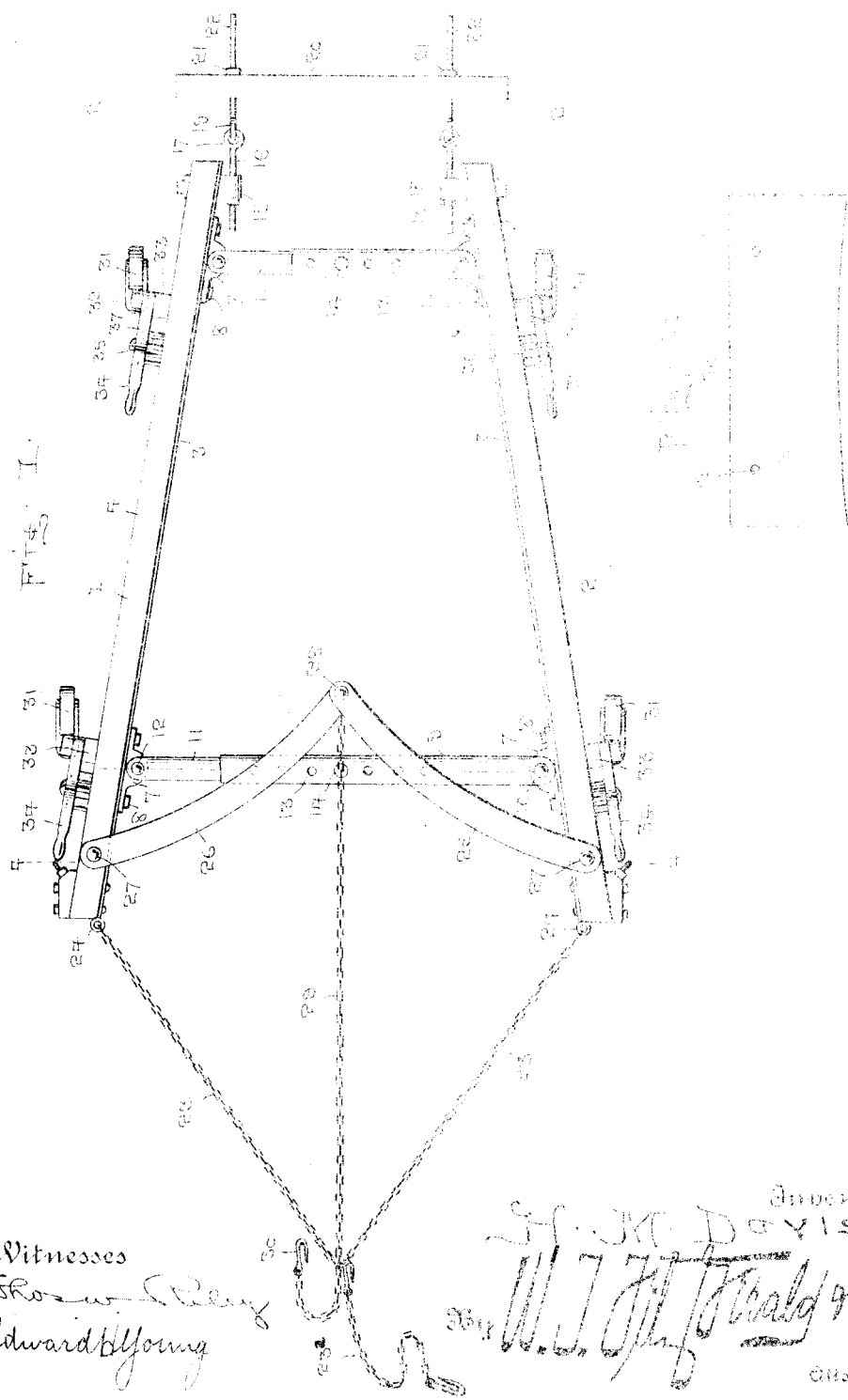

HARVEY MORRIS DAVIS, OF KINMUNDY, ILLINOIS.

ROAD-DRAG.

1,138,735.  Specification of Letters Patent.  Patented May 11, 1915.

Application filed July 3, 1914. Serial No. 848,824.

*To all whom it may concern:*

Be it known that I, HARVEY MORRIS DAVIS, a citizen of the United States, residing at Kinmundy, in the county of Marion and State of Illinois, have invented certain new and useful Improvements in Road-Drags; and I do hereby declare the following to be a full, clear, and exact description of the invention, such as will enable others skilled in the art to which it appertains to make and use the same.

This invention relates to road drags and in particular to road drags adapted to be folded or collapsed in order to cross bridges.

The main object of this invention is to provide an improved road drag adjustable to varying widths, which is very easily handled and, will thoroughly and evenly drag the road upon which it is used.

With this object in view the invention consists in the improved construction, arrangement and combination of parts of a road drag which will be hereinafter fully described and afterward specifically claimed.

I have illustrated an approved embodiment of the invention in the accompanying drawings in which—

Figure 1 represents a plan view, and Fig. 2, a sectional view on the plane indicated by the broken line 2—2 of Fig. 1.

Referring specifically to the drawings, 1 and 2 indicate oppositely disposed side bars each comprising a metallic drag face 3 and main body 4, suitably bolted together.

At suitable points in the front and rear portions of each of the side bars 1 and 2 are mounted bearing brackets 7, secured to the side bars by bolts 8 or other suitable fastening devices. Pivotally mounted upon each of one pair of these brackets 7 is a hollow bar 9 on a pivot pin 10. Like hollow bars 11 are attached by means of a suitable pivot pin 12, to the opposite brackets 7, the same being of a smaller diameter than the hollow bar 9, and adapted to slide in and out of said bar 9. Each of said bars 9 and 11 have a plurality of registering apertures 13 adapted to receive a locking pin 14 to lock them in adjusted position. A bolt bearing member 15 is mounted near the rear end of each of the side bars 1 and 2 and is adapted to receive the threaded shank 16 of an eye bolt 17, said shank being provided with a suitable nut 18, for longitudinal adjustment of the bolt.

Eye bolt 19, mounted in the eyes of the bolts 17 are adapted to engage in suitable apertures in a scraper bar 20, and are longitudinally adjusted by means of nuts 21 threaded upon the shanks 22 by which arrangement the scraper may be adjusted longitudinally of the machine.

Chains 23 are connected to each of the side bars by means of suitable eyes 24 and are connected to an engine by means of a suitable hook chain 23$^a$ adjustable in said chain 23 to give either a center, right or left drag. Pivotally mounted upon each side bar 1 and 2 near their front ends on pivot pins 27 are a pair of backwardly inclined bars 26 connected at their inner ends by a pivot pin 28, to which is attached the chain 29 having a hook 30 at its forward end which is connected to the engine or other puller to give expansible adjustment to the side bars and to thereby take the labor of said expansible movement off of the operator and throw it onto the engine. Upon the outside surface of each of said sides 1 and 2 near their front and rear ends are mounted a plurality of wheels 31. These wheels are each mounted in a swiveled bearing bracket 32, being suitably mounted in a bearing 33. Attached to the outside of each of the side bars is a bell-crank lever 34 which is pivoted at 35 to the face of each of the side bars, the bell-crank end of which is pivoted to the top of the bearing 32, and a quadrant 37 is mounted upon the pivot pin 35 to receive a suitable locking pawl (not shown) upon the bell-crank lever by which said wheels 31 are suitably adjusted to different depths to thereby raise the drag the desired height from the ground.

In operation the drag is adjusted to the desired expansion and the chains 23 and 23$^a$ adjusted to get the desired center or right or left drag, when the engine is started to draw the drag forward in the usual and customary manner.

When a bridge, or a narrow place in the road is to be crossed, the pins 14 are withdrawn, the hook 30 released, and the wheels lowered, when the side bars will fold inward as the drag is drawn forward by the engine.

Having now described my invention what I claim as new and desire to secure by Letters Patent is:—

A road drag comprising two side bars, longitudinally adjustable transverse connections, a pair of horizontal inwardly projecting bars pivoted to the front ends of the side bars and inclining backwardly, a pivot pin connecting the inner rear end of said pivoted bars, a chain connecting the front ends of the side bars, a hook chain adjustable on the connecting chain, and a hook chain secured at its rear end to the connecting pivot pin of the pivoted bars and adapted to be extended forward, crossing the connecting chain for connection with the engine or other puller.

In testimony whereof I have signed my name to this specification in the presence of two subscribing witnesses.

HARVEY MORRIS DAVIS.

Witnesses:
C. R. ALDERSON,
R. P. McBRYDE.